AUTOMATIC EQUALIZER FOR QUADRATURE DATA CHANNELS
Filed Dec. 27, 1965
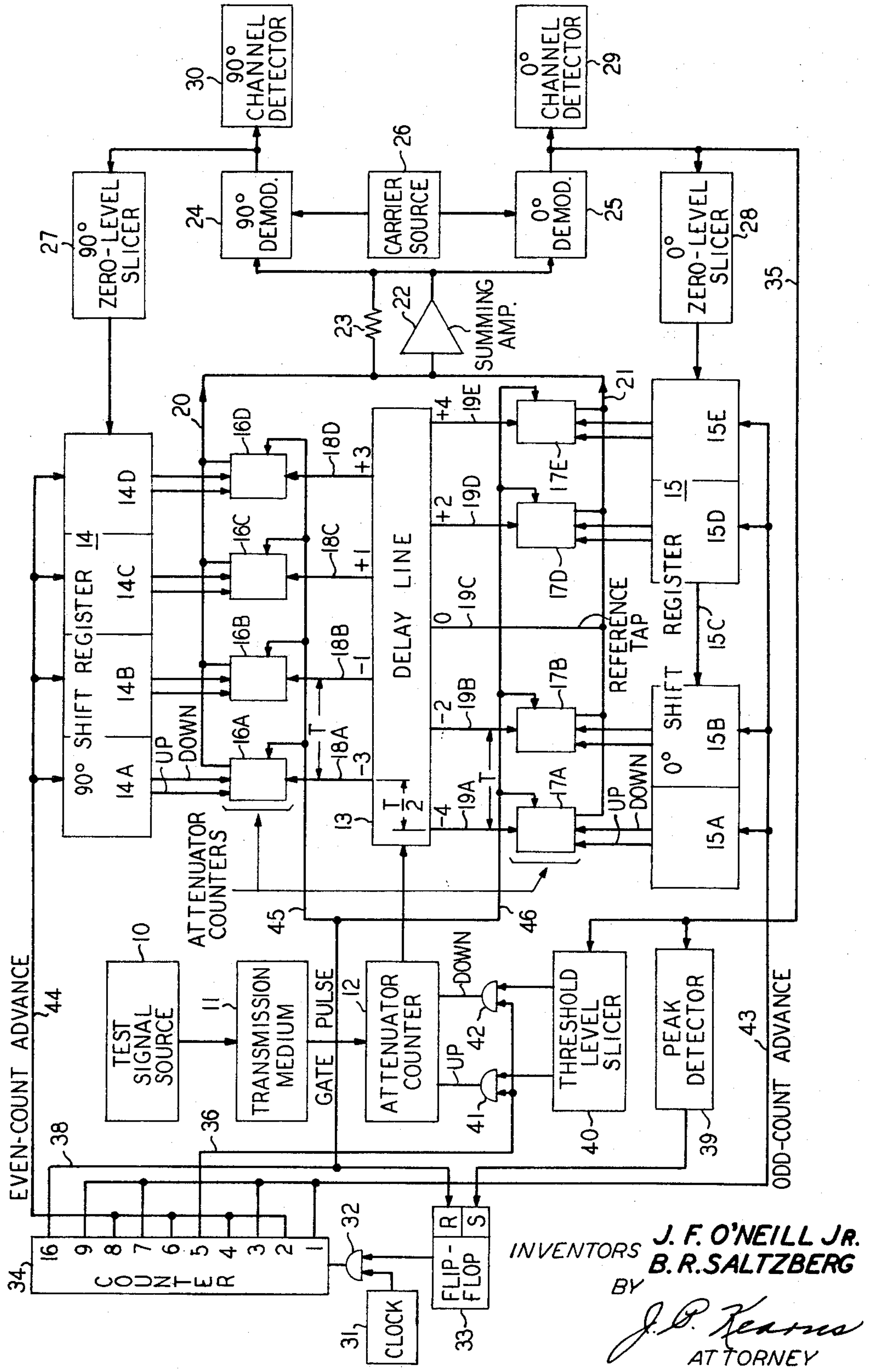
INVENTORS J. F. O'NEILL JR.
B. R. SALTZBERG
BY J. P. Kearns
ATTORNEY

United States Patent Office 3,400,332

Patented Sept. 3, 1968

3,400,332

AUTOMATIC EQUALIZER FOR QUADRATURE DATA CHANNELS

John F. O'Neill, Jr., Eatontown, and Burton R. Saltzberg, Middletown, N.J., assignors to Bell Telephone Laboratories, Incorporated, New York, N.Y., a corporation of New York Filed Dec. 27, 1965, Ser. No. 516,503

11 Claims. (Cl. 325—42)

ABSTRACT OF THE DISCLOSURE

An automatic equalizer is connected to a dual channel quadrature carrier transmission medium. The attenuators connected to the taps of the delay line of the equalizer are incrementally adjusted in accordance with the polarity of the received test pulses that appear at the outputs of the quadrature demodulators. The in-phase demodulator controls the even numbered attenuators and the quadrature-phase demodulator controls the odd numbered attenuators.

This invention relates to the correction of the distorting effects of transmission media of limited frequency bandwidth on digital data intelligence signals and particularly to the rapid automatic equalization of a dual-channel quadrature carrier data transmission system from a single-channel test signal.

This invention is an extension of the principles of the preset automatic equalizer disclosed in the copending joint patent application of F. K. Becker, R. W. Lucky and E. Port, Ser. No. 396,836 filed Sept. 16, 1964, now U.S. Patent No. 3,292,110 issued Dec. 13,1966, to quadrature carrier data transmission systems handling independent intelligence signals on the respective carrier waves traversing a single transmission medium. In the cited patent application a transversal filter of finite length optimizes at regular sampling instants the baseband time-domain impulse response of a connected single transmission channel of limited frequency bandwidth. The minimization of intersymbol interference due to the dispersive effects of a non-ideal transmission medium for synchronous digital data transmission is completed prior to message data transmission during a training period when test pulses are transmitted over the distorting transmission channel. During this period adjustable attenuators located at taps on the transversal filter are set at optimum values in response to polarity samples of the test pulses as they pass through the delay line portion of the filter. An iterative scheme of steepest descent increments of attenuator tap adjustments produces a preset optimum equalization of a synchronous baseband pulse transmission system in a most direct manner.

It is an object of this invention to extend the techniques and principles of the cited copending application to the automatic equalization of the time-domain impulse response of a dual-channel quadrature carrier data transmission system at the frequency of the carrier wave.

It is a further object of this invention to accomplish automatic equalization of the impulse response of both channels of a dual-channel quadrature carrier data transmission system from a test signal transmitted over only one of these channels.

It is another object of this invention to eliminate crosstalk between the respective channels of a dual-channel quadrature carrier data transmission system by automatic equalization techniques.

These objects and others are accomplished according to this invention by subjecting a transversal filter interposed between the distorting transmission medium and separate channel demodulators to a plurality of test pulses applied to one channel only of the transmission system during an initial training period. Based on a determination solely of the polarity of impulse response samples appearing in the outputs of the respective demodulators after traversing both the transmission medium and the transversal filter, the incrementally adjustable attenuators in the transversal filter are stepped in a direction inverse to such polarity determinations. Samples derived from the in-phase channel demodulator control the settings of attenuators located at even-ordered taps on the delay line portion of the transversal filter. Samples derived, on the other hand, from the quadrature-phase channel demodulator control the settings of the attenuators located at odd-ordered taps on the delay line. In this way a single transversal filter serves to equalize two independent carrier-wave channels and to eliminate crosstalk as well between the two channels.

Practice of this invention requires that the spacing of the taps on the delay line portion of the transversal filter, carrier frequency and data transmission rate be mutually compatible. The tap spacing must be half the data interval of each channel. Synchronous data rates on each channel must be identical, but staggered by half the data interval. Carrier frequency must be an odd multiple of half the data rate. Carrier frequency and bit-rate clocks may be derived from a common frequency source for this purpose.

The ability of a single transversal filter to equalize two independent data channels at the passband centered on the carrier frequency and to eliminate crosstalk between the two channels simultaneously are important features of this invention. Actual message data need not be truly independent in that the respective data trains may be the odd and even bits from a common serial message train.

This invention will be more clearly understood and other objects, features and advantages will become apparent upon consideration of the following detailed description of an illustrative embodiment of the principles of this invention and the drawing in which the single figure is a block diagram of the dual-channel passband automatic equalizer according to this invention.

In the drawing a test signal source 10 transmits impulses through transmission medium 11 for ultimate delivery to the location of channel detector 29 or 30. In the absence of any phase or amplitude distortion in medium 11 a test pulse transmitted therethrough on one of two quadrature carrier waves of the same frequency would be received by one and only one of detectors 29 or 30. Distorting effects of medium 11 can cause crosstalk onto the unmodulated carrier wave and result in a false signal in one of the detectors. To prevent such crosstalk and also intersymbol interference a transversal filter is interposed between medium 11 and detectors 29 and 30.

For purposes of illustration transmission medium 11 is assumed to be adaptable to transmit two separate channels of information in a particular frequency band by using double sideband amplitude modulation of two carriers at the same frequency but in quadrature phase. The carriers themselves may be suppressed. The bandwidth is assumed to be finite, but of width suitable for the desired speed of digital data transmission. The width is not important to the invention, however. The passband may be that of one or more voice-frequency bands as used in telephony. Medium 11 will further be assumed to include such modulation apparatus as necessary to translate baseband data signals to the normal passband thereof. Each message data symbol may be bilevel or multilevel. The symbol rate only need be known for the purposes of this invention.

The transversal filter proper is of the same general nature as that described in the Becker et al. application. It comprises a plurally tapped delay line member 13, a plurality of attenuator-counters 16 and 17 (one for each delay line tap but reference tap 0), and a summing amplifier 22. Attenuator-counter 12 is further included to normalize the magnitude of the signal component at the reference tap. Delay line 13 is assumed to be nonreflectively terminated by conventional means. Taps other than the reference tap will be referred to as lateral taps.

The transversal filter required by this invention differs from that of Becker et al. in having the taps on delay line 13 spaced at intervals of half the data symbol interval T, rather than the full interval.

However, no greater total number of taps for a given degree of equalization is required in the quaternary case than in the single channel case because the symbol interval relative to the tap spacing in the former is twice that in the latter. Further, the taps are divided into even- and odd-ordered groups with respect to reference tap 0. In the figure the odd-ordered taps (−3, −1, +1 and +3) are shown for illustrative purposes as emanating from the top of delay line 13; and the even-ordered taps (−4, −2, 0, +2 and +4), from the bottom. Even-ordered taps are displaced from each other by the interval T. Similarly, the odd-ordered taps have a mutual time displacement interval T. The odd-ordered taps are displaced from the even-ordered taps, however, by the interval $T/2$. The nine taps shown are for purposes of illustration. More or fewer may be required in a practical case to meet specific equalization needs.

Attenuator-counters 16A through 16D are connected to the odd taps by leads 18A through 18D. Attenuator-counters 17A through 17E are similarly connected to the even taps, except the reference tap at lead 19C, by leads 19A through 19E. The outputs of attenuator-counters 16 are connected in common to bus 20; and the outputs of attenuators-counters 17, to bus 21. Buses 20 and 21 join at the input of summing amplifier 22, which is shown as an operational amplifier with feedback resistor 23.

Attenuator-counters 16 and 17 are each of the type disclosed in the Becker et al. application and may include reversible counters and ladder-type attenuators incrementally controlled by the status of the associated counters. Similarly, attenuator-counter 12 is as described in the same application.

Shift register 14 has storage or memory cells 14A through 14D corresponding to attenuator-counters 16A through 16D. Shift register 15, similarly, has storage or memory cells 15A through 15E corresponding to attenuator-counters 17A through 17E. There is no center cell at position 15C. This position is bridged by a lead 15C at the location of the reference tap 19C. Both shift registers 14 and 15 may be the well known binary type. The complementary outputs of the individual cells are connected to the respective attenuator-counters by "up" and "down" leads as shown in the figure. Gate pulse buses 45 and 46 provide the count inputs to the respective groups of attenuator-counters after each test pulse has completely traversed delay line 13, as will be explained more fully below.

The output of summing amplifier 22 is applied in common to demodulators 24 and 25. The latter in turn are provided with demodulating carrier waves from carrier source 26. Carrier source 26 supplies a wave in phase with the transmitter carrier to 0° demodulator 25 and a wave in quadrature with the transmitter carrier to 90° demodulator 24. Carrier source 26 may be synchronized with the transmitter carrier by any means known to the art. The exact method of carrier synchronization forms no part of this invention.

0° and 90° channel detectors 29 and 30 are effectively data sinks and likewise form no part of this invention.

Zero-level slicers 27 and 28 operate on the demodulated outputs of demodulators 24 and 25 during the training or set-up period to produce outputs indicative of the polarity of their inputs. They may be of the Schmitt trigger type. Their outputs are stored in shift registers 14 and 15 as indicated. These polarity indications are sufficient to establish the direction of change in tap attenuator settings necessary to reduce the distortion. Repeated polarity sampling yields enough information to reduce the distortion to a minimum value. Provision for averaging polarity samples from successive test pulses before changing attenuator settings may be included by modifications in the clock and counting circuits to avoid unnecessary adjustments based on noise alone.

Auxiliary timing apparatus required for the operation of this invention comprises clock 31, counter 34, flip-flop 33 and peak detector 39. Clock 31 is conventional and may be synchronized with data signal transitions in any conventional way. The clock frequency, however must be twice the data rate to supply clock pulses corresponding to the normally staggered message data signals on the in-phase and quadrature channels. Counter 34 is also conventional. It must be capable of counting at least one more count than the number of taps on delay line 13. It is shown as capable of counting to 16 for illustrative purposes because this happens to be the maximum count of a four-stage counter. Counter 34 is driven from clock 31 through coincidence gate 32, which is enabled by flip-flop 33. Flip-flop 33 is also conventional and is set by the output of peak detector 39. Peak detector 39 preferably incorporates delay means so that counter 34 begins its count coincident with the arrival of the peak of a succeeding test pulse at the leftmost tap on delay line 13.

The outputs of counter 34 are divided into four sets for control purposes. All of the first nine counts are used while the test pulse is passing through delay line 13. The odd counts, omitting count five, up to nine (for a nine-tap delay line) control the shifting of 0° shift register 15. The even counts control the shifting of 90° shift register 14. Count five, corresponding to sampling at the reference tap, controls normalizing attenuator-counter 12 as described below. The center stage of shift register 15 is not used, but its position is bridged by lead 15C, as already mentioned. The terminal count, indicated for illustrative purposes as 16, resets flip-flop 33, stops counter 34 and supplies a gate pulse to change the settings of attenuator-counters 16 and 17.

Normalizing attenuator-counter 12 is of the same construction as attenuator-counters 16 and 17, and maintains the general level of the signal entering delay line 13 in the manner of an automatic gain control circuit. Threshold level slicer 40 operates effectively on the peak of the received test pulse as it reaches reference tap 19C, is demodulated in 0° demodulator 25, and is applied thereto over lead 35. The slicing level of slicer 40 is established at some optimum reference level predetermined empirically. Binary outputs of slicer 40 are applied to coincidence gates 41 and 42, enabled by count five of counter 34. Attenuator-counter 12 is accordingly incrementally stepped up or down to maintain a required mean input level and polarity for the transversal filter.

The operation of the automatic equalizer of this invention is carried out during a training period by the transmission over transmission medium 11 of uniform test pulses of multiple frequency content from source 10. Test pulse spacing is preferably coordinated with the maximum count provided in counter 34. On the initial assumption that all attenuator-counters 16 and 17 are set to zero, the only usable output from delay line 13 is at reference tap 19C. A first test pulse modulated on the 0° carrier wave traverses medium 11 and attenuator-counter 12. Upon the arrival of its peak amplitude at reference tap 19C on delay line 13 of the transversal filter a signal is transmitted on bus 21 to summing amplifier 22 and thence to 0° demodulator 25. Its effect on 90° demodulator 24 is unimportant at this time. This signal is at a level to operate peak detector 39 in a manner described in connection with FIG. 10 of the cited Becker et al. application. After an appropriate delay period incorporated in detector 39, flip-flop circuit 33 is set and produces an output which enables coincidence gate 32. The delay period required in the illustrative embodiment would clearly be 16 (the maximum count of the counter) less 4 (the number of counting intervals between the leftmost tap 19A on delay line 13 and the reference tap 19C) for a difference of 12 delay units. Upon enablement of gate 32 continuously running clock source 31 begins to drive counter 34.

If the delay in peak detector 39 and the spacing between test pulses is properly coordinated, the peak of the next test pulse would be arriving at the leftmost tap 19A on delay line 13. The first significant leading component of the impulse response within the equalization capabilities of a nine-tap delay line appears at reference tap 19C on the delay line. It is then summed, demodulated, and the baseband resultant sliced in slicer 28. The output of slicer 28, plus or minus, is accordingly stored in the rightmost stage 15E of the 0° shift register 15. Shortly thereafter the first count output of counter 34 appearing on odd-count advance lead 43 advances the contents of shift register 15 one stage to the left.

At a time interval $T/2$ later any cross-modulation component appearing on the 90° carrier is similarly summed over bus 20 and demodulated in 90° demodulator 24. This baseband output is sliced in 90° slicer 27 and stored in stage 14D of 90° shift register 14. Count two from counter 34 on even-count advance lead 44 advances the contents of 90° shift register 14 one stage to the left.

In subsequent $T/2$ time intervals further impulse response samples of the test pulse are summed, demodulated and sliced alternately in the respective channels until a complete set of polarity indications of such samples is stored from left to right in shift registers 14 and 15 opposite the delay line tap at which it will be compensated. The response sample taken when the peak of the test pulse is located at reference tap 19C has only a transitory effect on the polarity indications stored in shift register 15 because no advance pulse occurs at that time. The fifth count occurring at that time affects only normalizing attenuator-counter 12. The response sample, however, does operate peak detector 39 again in preparation for sampling the next test pulse.

On the last count of counter 34 (count 16 in the illustrative embodiment) an output on lead 38 is divided between buses 45 and 46 to enable the counters in attenuator-counters 16 and 17. Each of these counters is then advanced or retarded by one count in accordance with the polarity indications stored in shift registers 14 and 15, which are connected by the up and down leads indicated on the drawing to the associated attenuator-counter. If the polarity indication is positive, the attenuator-counter is activated on the up lead to advance the count, and thereby increase the amount of attenuation in the positive direction, and vice versa for negative polarity indications stored in the shift registers.

As corresponding samples of subsequently transmitted test pulses are taken, the summations taken will necessarily include contributions from taps other than the reference tap, since the attenuators are no longer at zero settings. In this way the intersymbol interference in each channel is optimally compensated, and there is no crosstalk between channels. Eventually, after sufficient test pulses are sampled, attenuator-counter settings will be established to force the outputs of the lateral taps substantially to zero and to reduce the net output of the attenuator-counters respectively on the positive and negative delay line taps to a minimum within the range of the delay line and the incremental attenuator step chosen. Any lateral taps that reach this minimum output level before others of the taps will be subject to the random walk type of adjustment discussed in the cited Becker et al. application. Any Gaussian noise accompanying the incoming test pulse will also affect this random walk characteristic. Therefore, it is expedient to establish the size of the incremental step of attenuation slightly below the average noise level.

The number of test pulses needed to complete the automatic equalization is related to the magnitude of the largest distortion likely to be encountered, the size of the attenuator increment, and the ambient noise level. The effects of noise, being random, will be largely self-canceling.

The assumption here that all attenuators are initially at zero was made only for purposes of explanation. Regardless of the initial attenuator settings, optimum equalization will be achieved step-by-step along the steepest gradient path. A sufficient condition for convergence of the equalizer adjustment operation is that the initial distortion, including crosstalk is less in the aggregate than the peak amplitude of the test pulse.

The justification for using test pulses on only one of the quadrature channels lies in the symmetry of the system. Signals appearing at the even-order taps are in quadrature with signals appearing on the odd-order taps because the carrier frequency is chosen as an odd multiple of the reciprocal of the tap spacing. During the training period isolated pulses directly modulate the 0° carrier wave only. Thus, the samples from the 0° demodulator 25 stored in shift register 15 are due to intersymbol interference. The samples from the 90° demodulator 24, which are stored in shift register 14, are due to crosstalk between the 0° and 90° channels.

The tap spacing is at half the symbol interval on either channel. The intersymbol interference and the crosstalk samples are likewise displaced by half the symbol interval. The outputs of all lateral taps are thus forced to zero levels, independently of the label attached to the type of interference which caused the adjustment of their associated attenuators. During actual message data transmission the sampling times of the two channels are also staggered by half the symbol interval. The tap gain settings produced during the set-up period thus serve to eliminate at the proper sampling times both intersymbol interference and crosstalk from both channels. Mathematical analysis will bear this out.

Once the established training period is over, the attenuator settings are frozen by disconnecting zero-level slicers 27 and 28, threshold-level slicer 40 and peak detector 39 from the circuit in any convenient manner. Test signal source 10 is then replaced by a message signal source modulating both the in-phase and quadrature message channels. The set-up apparatus can be transferred to another transversal filter by means readily devised by those skilled in the art.

The invention is not to be considered limited to the specific illustrative embodiment here disclosed. It would be obvious, for example, to transmit the test pulses in the quadrature channel instead of in the in-phase channel. Various modifications within the scope of the appended claims will be apparent to those skilled in the art to which it relates.

What is claimed is:

1. Apparatus for establishing optimum settings for the attenuators in a transversal equalizer for a data transmission system in which independent trains of data symbols are modulated on quadrature carrier waves of the same frequency traversing a distorting transmission medium comprising means for transmitting test pulses modulated on one of said carrier waves, a plurality of taps on said equalizer evenly spaced at half the data symbol interval, each such tap except a reference tap having an associated attenuator, means for summing the outputs of all said attenuators and said reference tap, means for separately demodulating signals from said summing means as modulated on each phase of said carrier wave, means for separately detecting the polarity of time-spaced samples of the demodulated signals from each of said demodulating means, means separately and sequentially storing polarities of samples from said detecting means, means incrementally adjusting the attenuators at the even-order taps on said equalizer in inverse relation to stored polarity samples of test pulses demodulated from one phase of said carrier wave, and further means incrementally adjusting the attenuators at odd-order taps on said equalizer in inverse relation to the stored polarity samples of test pulses demodulated from the other phase of said carrier wave.

2. Apparatus defined in claim 1 in which said transversal equalizer comprises a delay line having an input end connected to said transmission medium, a plurality of lateral output taps spaced along said delay line at half the data symbol interval on either carrier wave, the outputs of even-order taps corresponding to samples of the impulse response of data signals modulated on one of said carrier waves, the outputs of odd-order taps corresponding to samples of the impulse response of data signals modulated on the other of said carrier waves, and means for performing an algebraic addition of the outputs from all said lateral output taps.

3. Apparatus defined in claim 1 in combination with means connected to the output of the demodulating means for the in-phase carrier wave detecting the peak amplitude of a domedulated test signal and producing a corresponding output signal, and counting means enabled by said detector output signal for controlling the sequential operation of said separate storing means.

4. Apparatus defined in claim 1 in combination with means normalizing the peak amplitudes of test pulses applied to said transversal filter comprising a threshold circuit at the output of the demodulating means for the in-phase carrier wave producing a bipolar output according to whether signals applied thereto lie above or below the threshold level thereof, an attenuator-counter interposed between said transmission medium and said transversal equalizer incrementally adjustable in fixed steps of attenuation about a medium value corresponding to the threshold of said threshold circuit, and means gating the state of said threshold circuit as the peak amplitude of each test pulse arrives at the reference tap of the transversal equalizer to the counter portion of said attenuator-counter to adjust the attenuation thereof by one step in a direction to compensate for the departure of the peak amplitude of each test pulse from said threshold level.

5. Apparatus defined in claim 1 in which each of said detecting means comprises a zero threshold circuit having a bipolar output according to whether the input signal lies above or below the zero level.

6. Apparatus defined in claim 1 in which each of said storing means comprises a multistage shift register.

7. Apparatus defined in claim 1 in which the frequency of said carrier waves is an odd harmonic of half the data symbol rate.

8. Apparatus defined in claim 1 in which the data symbol rates on each of the quadrature channels are identical, but staggered by half a symbol interval.

9. The combination set forth in claim 8 with means normalizing the peak input to said transversal equalizer comprising a threshold circuit at the output of the in-phase demodulating means producing a bipolar output according to whether signals thereat lie above or below the threshold thereof, an attenuator-counter interposed between said transmission medium and said equalizer incrementally adjustable in fixed steps of attenuation about a medium value corresponding to the threshold of said threshold circuit, and means gating the state of said threshold circuit when the peak of each test pulse is coincident with the reference tap on said equalizer to the counter portion of said attenuator-counter to adjust the attenuation thereof in a direction to compensate for the departure of the demodulated test pulse peak amplitude from said threshold.

10. In combination, a transmission medium carrying two independent channels of data symbols modulated in interleaved fashion on respective quadrature carrier waves of the same frequency, said transmission medium having nonlinear delay and amplitude characteristics which differentially delay and attenuate the frequency content of traversing signals, a test signal source applying a series of pulses to said medium for modulation on the in-phase one of said carrier waves, a transversal equalizer having a delay line with uniformly spaced lateral output taps at half the symbol rate of either of said channels connected to receive the passband output of said transmission medium, a plurality of incrementally adjustable attenuators connected to all the lateral taps of said delay line except a reference tap, a summing circuit common to all said attenuators and said reference tap having an output equal to the algebraic sum of its inputs, demodulator means for each of the in-phase and quadrature carrier-wave channels connected to said summing circuit, a local carrier-wave source for said demodulator means, zero-level slicing circuits responsive to the respective demodulator means, first and second shift registers storing polarity indications derived by each of said slicing circuits from successive samples of each test impulse, counting means having at least as many counts as the number of taps on said equalizer, odd counts from said counting means advancing the contents of the shift register storing samples derived from the in-phase demodulator means and even counts therefrom advancing the contents of the other shift register, a plurality of reversible counters associated with said adjustable attenuators for advancing or retarding by a single increment the setting of the associated attenuator in accordance with the polarity of the contents of the respective shift registers after a full complement of samples is derived from each test pulse, a peak detector responsive to the incidence of each test pulse at the reference tap on said equalizer, clock means establishing a sampling rate at twice that of said symbol rate, and means jointly responsive to said peak detector and said clock means operating said counting means.

11. In combination with a quadrature carrier dual channel synchronous data receiver connected to a transmission medium having a dispersive effect upon the different frequency components of signals applied to either channel, apparatus for establishing optimum settings for the attenuators in a transversal equalizer in said receiver comprising means transmitting a succession of pulse test signals on one only of said channels through said medium and said equalizer, a plurality of lateral taps on said equalizer equally spaced by the reciprocal of twice the synchronous transmission rate of either channel, a plurality of attenuators in series with each said tap but one reference tap and adjustable in discrete steps, means summing the attenuator outputs and the direct output of said reference tap, a carrier-controlled demodulator for each of said channels connected to said summing means, means determining the polarity of time-spaced samples from each said demodulator, memory cell means sequentially storing indications of the polarity of successive samples from each said polarity-determining means until each test pulse has completely traversed said equalizer, means connected to the demodulator for the channel in which test pulses are transmitted for detecting the presence of the peak amplitude of each test pulse at said reference tap, timing means actuated by said peak-detecting means controlling the sequential operation of said memory cell means, and means gating the contents of the memory cell means associated with the channel carrying said test pulses to increment the settings of attenuators at the even-ordered taps on said equalizer and the contents of the other memory cell means to increment the settings of attenuators at the odd-ordered taps on said equalizer after each test pulse has completely traversed said equalizer.

References Cited

UNITED STATES PATENTS

| | | | |
|---|---|---|---|
| 3,071,739 | 1/1963 | Runyon | 333—18 |
| 3,283,063 | 11/1966 | Kawashima et al. | 325—65 X |
| 3,292,110 | 12/1966 | Becker et al. | 333—18 |
| 3,308,431 | 3/1967 | Hopner et al. | 325—42 X |
| 3,366,895 | 1/1968 | Lucky | 333—18 |

ROBERT L. GRIFFIN, *Primary Examiner.*

W. S. FROMMER, *Assistant Examiner.*